United States Patent
Giannatto (10) Patent No.: US 6,606,132 B2
(45) Date of Patent: *Aug. 12, 2003

(54) VIBRATION AND SHOCK RESISTANT LIQUID CRYSTAL DISPLAY AND ASSOCIATED METHOD

(75) Inventor: Carl J. Giannatto, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/790,972

(22) Filed: Feb. 22, 2001

(65) Prior Publication Data

US 2002/0003591 A1 Jan. 10, 2002

Related U.S. Application Data

(63) Continuation of application No. 08/918,152, filed on Aug. 25, 1997, now Pat. No. 6,252,639.

(51) Int. Cl.⁷ ............... G02F 1/1333; G02F 1/1347; G02F 1/1345; G06F 1/16
(52) U.S. Cl. ............... 349/58; 349/60; 349/74; 349/149; 361/681
(58) Field of Search ............... 349/58.06, 74, 349/149; 361/681

(56) References Cited

U.S. PATENT DOCUMENTS

| | | | | |
|---|---|---|---|---|
| 4,050,786 A | * | 9/1977 | Feldman | 349/155 |
| RE32,521 E | | 10/1987 | Fergason | 350/334 |
| 4,715,686 A | | 12/1987 | Iwashita et al. | 350/339 |
| 5,146,355 A | | 9/1992 | Prince et al. | 359/50 |
| 5,150,231 A | | 9/1992 | Iwamoto et al. | 349/44 |
| 5,168,384 A | | 12/1992 | Genba | 359/83 |
| 5,317,488 A | | 5/1994 | Penrod | 362/84 |
| 5,406,399 A | * | 4/1995 | Koike | 349/58 |
| 5,532,851 A | | 7/1996 | Usami | 359/73 |
| 5,539,548 A | | 7/1996 | Yamazaki et al. | 359/53 |
| 5,539,552 A | | 7/1996 | Desai et al. | 359/66 |
| 5,606,438 A | | 2/1997 | Margalit et al. | 349/60 |
| 5,663,776 A | | 9/1997 | Behrends | 349/58 |
| 5,828,427 A | | 10/1998 | Faris | 349/5 |
| 5,880,795 A | * | 3/1999 | Nagata et al. | 349/58 |
| 5,907,375 A | | 5/1999 | Nishikawa et al. | 349/12 |
| 5,953,087 A | | 9/1999 | Hoyt | 349/58 |
| 6,071,755 A | | 6/2000 | Baba et al. | 438/106 |

FOREIGN PATENT DOCUMENTS

| | | | | |
|---|---|---|---|---|
| JP | 61-4018 | | 1/1986 | G02F/1/133 |
| JP | 01-177018 A | * | 7/1989 | |
| JP | 05-045627 A | * | 2/1993 | |
| JP | 5-113559 A | * | 5/1993 | |

* cited by examiner

*Primary Examiner*—Tarifur R. Chowdhury
(74) *Attorney, Agent, or Firm*—Allen, Dyer, Doppelt, Milbrath & Gilchrist, P.A.

(57) ABSTRACT

A liquid crystal display (LCD) includes a first panel assembly and a second panel assembly with a liquid crystal material layer therebetween. The first panel assembly has a resonant frequency substantially the same as the second panel assembly's. The first panel assembly has substantially matched mechanical properties to the second panel assembly. Each of the assemblies may include a support panel, such as provided by a glass plate. A front assembly, may also include at least one filter panel. The LCD may also include a frame mounted around a periphery of the first and second panel assemblies. The first panel assembly has a coefficient of thermal expansion substantially the same as a coefficient of thermal expansion of the second panel assembly. The frame also has a coefficient of thermal expansion substantially the same as the coefficient of thermal expansion of the first and second panel assemblies.

20 Claims, 5 Drawing Sheets

VIBRATION AND SHOCK RESISTANT LIQUID CRYSTAL DISPLAY AND ASSOCIATED METHOD

This application is a continuation of Ser. No. 08/918,152 filed on Aug. 25. 1997.

GOVERNMENT LICENSE RIGHTS

The U.S. Government has a paid-up license in this invention and the right in limited circumstances to require the patent owner to license others on reasonable terms as provided for by the terms of contract No. DAAJ09-91-C-A004, subcontract No. KAA005 awarded by the U.S. Army.

FIELD OF THE INVENTION

The present invention relates to the field of displays, and, more particularly, to a rugged display for use in severe shock and vibration environments.

BACKGROUND OF THE INVENTION

Liquid crystal displays (LCDs) are widely used to convey information to a user, especially where the information is generated by a computer or processor. For example, an LCD is commonly used in a personal computer, a portable data terminal, to display information to a user. An LCD may also find use in aircraft and other vehicles that may subject the LCD to severe shocks or vibration.

An LCD typically includes a pair of opposing glass cover plates with the liquid crystal material positioned between the cover plates. This structure is typically referred to as an LCD sandwich. One or more polarizing layers may be joined to the glass cover plates for a typical LCD. Unfortunately, the liquid crystal material may be readily damaged by shock or vibration imparted to the display.

Attempts have been made in the past to ruggedize a conventional LCD to survive shocks, such as from dropping and/or vibration. One or more supporting plates may be joined to the front or back surfaces of the LCD sandwich, as disclosed, for example, in U.S. Pat. No. 5,606,438 to Margalit et al. The patent further discloses a ruggedized LCD incorporating layers of adhesive which extend continuously across the front and back surfaces of the LCD sandwich. The adhesive layers join the LCD sandwich to a front glass plate and a rear diffuser.

The adhesive layer on the front is described as increasing the moment of inertia of the LCD sandwich by causing the LCD sandwich and front glass to behave as single unit. Accordingly, localized stress is reduced when the unit as a whole suddenly decelerates in a drop test, for example. In addition, the thickness of the adhesive layer is disclosed as between 4 to 20 or 30 microns to thereby allow differential thermal expansion between the LCD sandwich and the front glass, for example. Further, the front glass plate includes edge portions which extend outwardly and are captured in a corresponding recess of a plastic mounting frame so that the LCD is suspended from the front glass plate carried by the frame.

U.S. Pat. No. 5,150,231 to Iwamoto et al. discloses another approach to ruggedizing an LCD. In particular, the patent discloses an LCD panel which is mounted to a frame by elastic members. In addition, the frame defines an almost enclosed space behind the LCD which traps air to dampen motion and thereby further protect the LCD from dropping or vibration.

Unfortunately, conventional approaches to ruggedizing an LCD may not be successful in protecting the relatively delicate liquid crystal material against shock and vibration. This may be so especially in a vehicle, such as an aircraft, which may have severe and sustained vibration levels.

Conventional attempts to ruggedize an LCD have also overlooked the compatibility between frame materials and the glass, for example, of the LCD. A rigid plastic frame, for example, has a different coefficient of thermal expansion compared to glass and may cause the LCD glass to break under extremes of temperature. Accordingly, operation over relatively wide temperature ranges may require complicated mounting techniques or the effective operating temperature may be restricted. In addition, attempting to isolate the glass from the frame may increase difficulties with shock and vibration.

SUMMARY OF THE INVENTION

In view of the foregoing background, it is therefore an object of the present invention to provide an LCD which is resistant to high shock and vibration levels.

It is another object of the present invention to provide an LCD which is readily mounted while taking into account compatibility of the frame material and the LCD materials.

These and other objects, advantages and features of the present invention are provided by an LCD including a first panel assembly and a second panel assembly with a liquid crystal material layer positioned therebetween, and wherein the first panel assembly has a resonant frequency substantially the same as a resonant frequency of the second panel assembly so that the LCD is resistant to damage from shock and vibration. The first panel assembly preferably comprises a first cover panel immediately adjacent the liquid crystal material layer and at least one additional panel positioned adjacent the first cover panel. Similarly, the second panel assembly may comprise a second cover panel immediately adjacent the layer of liquid crystal material and at least one additional panel adjacent the second cover panel. In other words, a typical LCD sandwich including the first and second cover panels with the liquid crystal material layer therebetween, further includes one or more additional support panels.

Considered in different terms, the first panel assembly has substantially matched mechanical properties to the second panel assembly. For example, the substantially matched mechanical properties preferably include a stiffness to mass ratio. In addition, the resonant frequency is preferably a first mode resonant frequency. Accordingly, damage caused by the relative motion between the first and second assemblies is avoided by matching the first and second assemblies so that they may move together.

For additional resistance to shocks, each of the assemblies may include a support panel, such as provided by an additional glass plate. A front assembly, may also include at least one filter panel or plate.

Another aspect of the invention relates to a frame mounted around a periphery of the first and second panel assemblies. Preferably, the first panel assembly has a coefficient of thermal expansion substantially the same as a coefficient of thermal expansion of the second panel assembly. For additional compatibility, the frame also preferably has a coefficient of thermal expansion substantially the same as the coefficient of thermal expansion of the first and second panel assemblies.

A method aspect of the invention is for making a liquid crystal display (LCD) resistant to damage from vibration. The liquid crystal display is preferably of a type including a liquid crystal material layer positioned between two cover panels. The method preferably comprises the step of positioning at least one additional panel adjacent at least one cover panel to define first and second panel assemblies on opposite sides of the liquid crystal material layer so that the first panel assembly has a resonant frequency substantially the same as a resonant frequency of the second panel assembly.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The thickness of various layers may be exaggerated for clarity.

Figure 1:
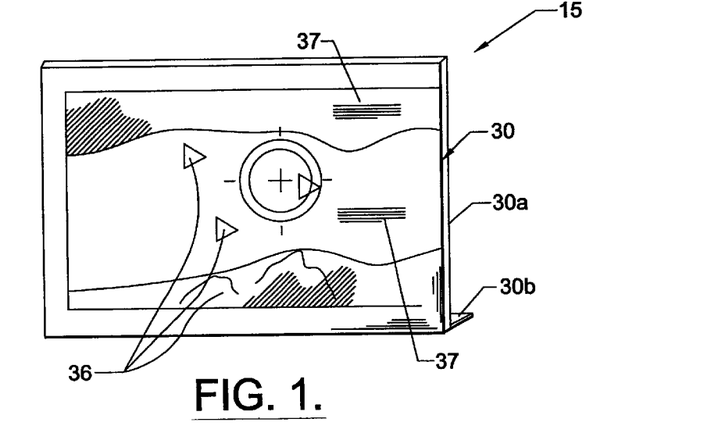
FIG. 1 is a front perspective view of an LCD in accordance with the present invention.
Figure 2:
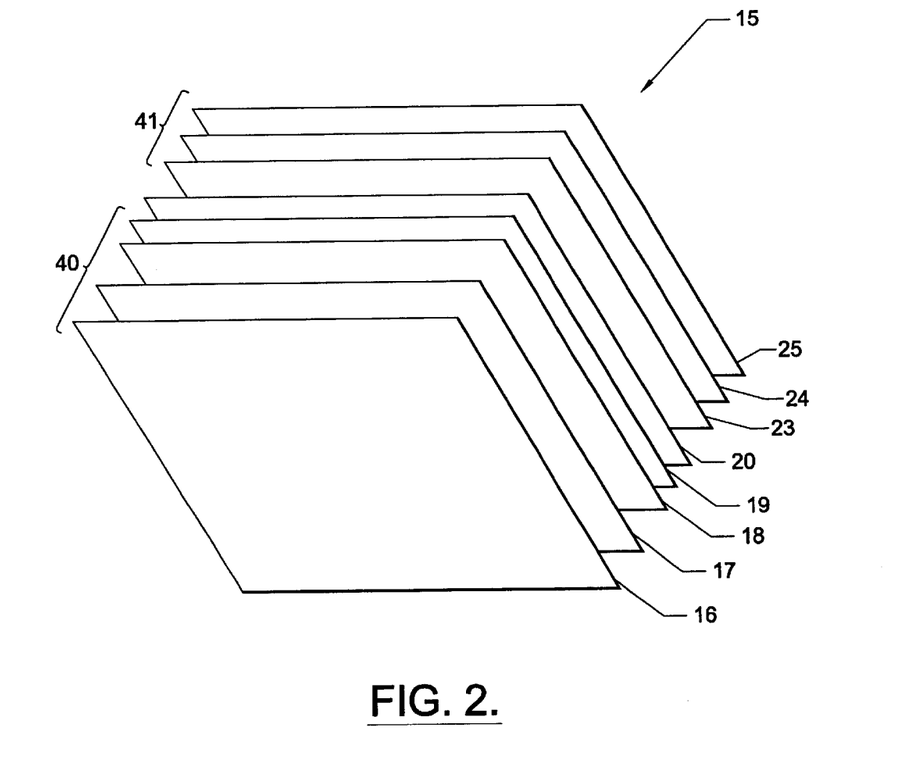
FIG. 2 is an exploded perspective view of a portion of the LCD in FIG. 1.
Figure 3:
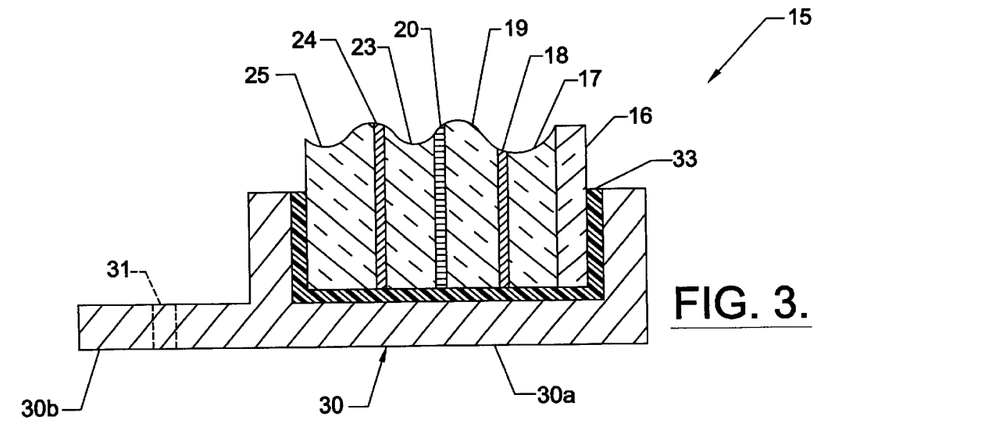
FIG. 3 is a greatly enlarged side cross-sectional view of a portion of the LCD in FIG. 1.

Referring initially to FIGS. 1–3, a first embodiment of an LCD 15 in accordance with the present invention is now described. The LCD 15 may used to display images 36 and/or text 37, for example, under computer control as would be readily understood by those skilled in the art. The LCD 15 includes a plurality of stacked panels and a frame 30. The LCD 15 may be used in many environments, such as aircraft and other vehicles, for example, which may subject the LCD to severe shocks and vibration. The present LCD is directed to being more resistant to such extreme conditions as described in greater detail below.

The frame 30 illustratively includes a body portion 30a which surrounds the periphery of the stacked panels, and a flange or mounting portion 30b which extends outwardly from a bottom portion of the body. Of course, those of skill in the art will appreciate many other configurations for the frame 30 and especially the flange or mounting portion 30b. As shown in the enlarged cross-sectional view of FIG. 3, a relatively thick adhesive layer 33, such as an RTV compound or material, may be used to seal the stacked panels in the U-shaped channel defined by the body portion 30a of the frame 30. The RTV is desirably not so thick as to subject the LCD to further vibration effects. In addition, as also shown in FIG. 2, one or more mounting openings 31 may be provided in the flange portion 30b to facilitate mounting via suitable fasteners.

The LCD 15 includes in stacked relation: an enhancement filter 16, a second enhancement filter 17, a polarizer 18, and a first cover panel 19 collectively defining a first or front panel assembly 40 (FIG. 2). The liquid crystal material layer 20 is immediately adjacent the first cover panel 19 of the front panel assembly 40. The second or rear panel assembly 41 includes the second cover panel 23, the second polarizer 24, and a support glass panel 25. An adhesive, not shown, is used to bond the interfaces between certain of the adjacent panels as would be readily understood by those skilled in the art.

The present invention recognizes that to reduce the potentially damaging effects of shock and vibration, the front and rear panel assemblies 40, 41 should be matched in terms of resonant frequency. In other words, the stiffness to mass ratio of the front panel assembly 40 matches that of the rear panel assembly 41.

Thus, the LCD 15 becomes much more resistant to shock and vibration. As the front panel assembly 40 is typically defined by the application dependent filters as shown in the illustrated embodiment, the support glass panel 25 of the rear assembly 41 can be selected and tailored so that the front and back assemblies match. Of course, in other embodiments, support glass plates could be added to both the front and rear assemblies or just the front assembly as would be readily appreciated by those skilled in the art, as long as the assemblies matched in terms of stiffness to mass ratio to thereby match the resonant frequencies.

Considered in somewhat different terms, the front or first panel assembly 40 has substantially matched mechanical properties to the second or rear panel assembly 41. For example, the substantially matched mechanical properties preferably include, for example, the stiffness to mass ratio. In addition, the resonant frequency is preferably a first mode resonant frequency. Accordingly, damage potentially caused by the relative motion between the first and second assemblies 40, 41 is avoided by matching the resonant frequencies of the first and second assemblies.

Another aspect of the invention relates to the material and properties of the LCD mounting frame 30. Preferably, the front panel assembly 40 has a coefficient of thermal expansion substantially the same as a coefficient of thermal expansion of the rear panel assembly 41, which is typically the case since both include primarily glass. For additional compatibility, the frame 30 also preferably has a coefficient of thermal expansion substantially the same as the coefficient of thermal expansion of the first and second panel assemblies. As would be readily understood by those skilled in the art, the temperature range of interest may be from −65° to 185° F.

For example, the coefficient of thermal expansion for glass is about 2.6 to 6.2 in/(in)(°F.)×10$^{-6}$, and may typically be about 3.0 in/(in)(°F.)×10$^{-6}$ for an LCD. Unfortunately, aluminum, which is relatively lightweight and strong, has a relatively high coefficient of thermal expansion in a range of about 12.6 to 13.7 in/(in) (°F.)×10⁻⁶. In one embodiment of the present invention, the frame 30 preferably includes titanium which has a coefficient of thermal expansion of about 5.2 in/(in)(°F.)×10⁻⁶. Titanium is both lightweight and relatively strong, which makes it highly desirable for the present application. Other materials and composites, for example, may also be used that have a similar compatible coefficient of thermal expansion.

A method aspect of the invention is for making an LCD 15 as described above. The LCD 15 is preferably of a type including a liquid crystal material layer positioned between two cover panels. The method preferably comprises the step of positioning at least one additional panel 25 adjacent at least one cover panel to define first and second panel assemblies 40, 41 on opposite sides of the liquid crystal material layer 20 so that the first panel assembly has a resonant frequency substantially the same as a resonant frequency of the second panel assembly.

EXAMPLE

Figure 4:
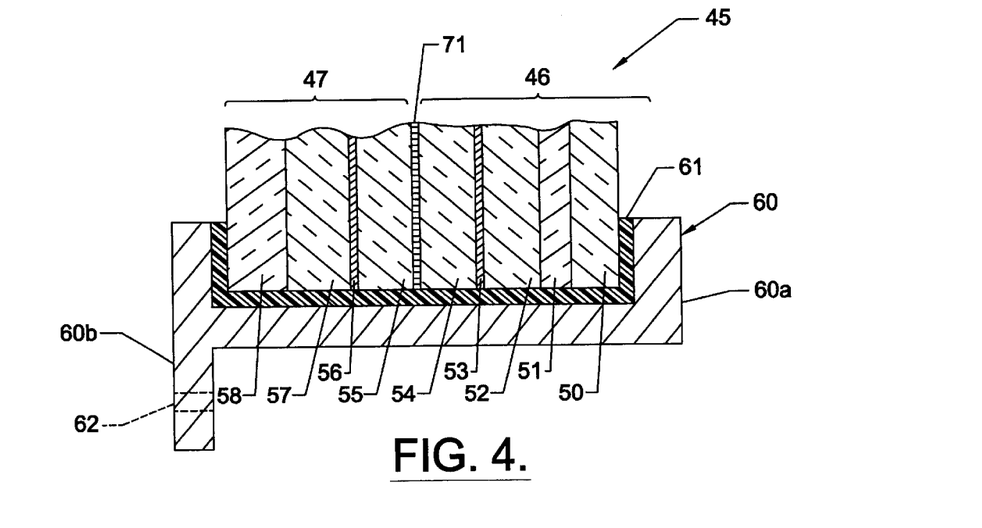
FIG. 4 is an enlarged side cross-sectional view of a portion of another embodiment of an LCD in accordance with the present invention and as explained in the example.

The description is now directed to an example illustrating determination of the matching properties of the front and rear panel assemblies for an embodiment of an LCD 45 as shown in the cross-sectional view of FIG. 4. This embodiment includes a front panel assembly 46 comprising in stacked relation: a first front borosilicate glass panel 50, a filter panel 51, a second front borosilicate glass panel 52, a front polarizer 53, and the front cover glass panel 54. The rear panel assembly includes in stacked relation: a first rear borosilicate glass panel 58, a second rear borosilicate glass panel 57 (optional), a rear polarizer 56, and the rear glass cover panel 55B. The liquid crystal material layer 71 is between the front and rear assemblies 46, 47. As would be readily understood by those skilled in the art, various epoxy bond layers, not shown, are positioned between the adjacent panels.

The LCD 45 includes a frame 60 including a body portion 60a and a flange portion 60b. A layer of sealing material 60 is in the U-shaped channel defined by the body portion 60a. Openings 62 may be provided to mount the LCD using suitable fasteners.

In this example, the front panel assembly 46 is first considered, then the rear panel assembly 47 is considered. The rear assembly glass is determined to match the resonant frequency of the front glass panel assembly. This further description assumes the inner and outer surfaces of the LCD act independent of each other from a structural stiffness view point. Therefore only one surface is considered. In general, the vibration frequencies of interest are in the range of about 5 Hz to 2 KHz.

Figure 5:
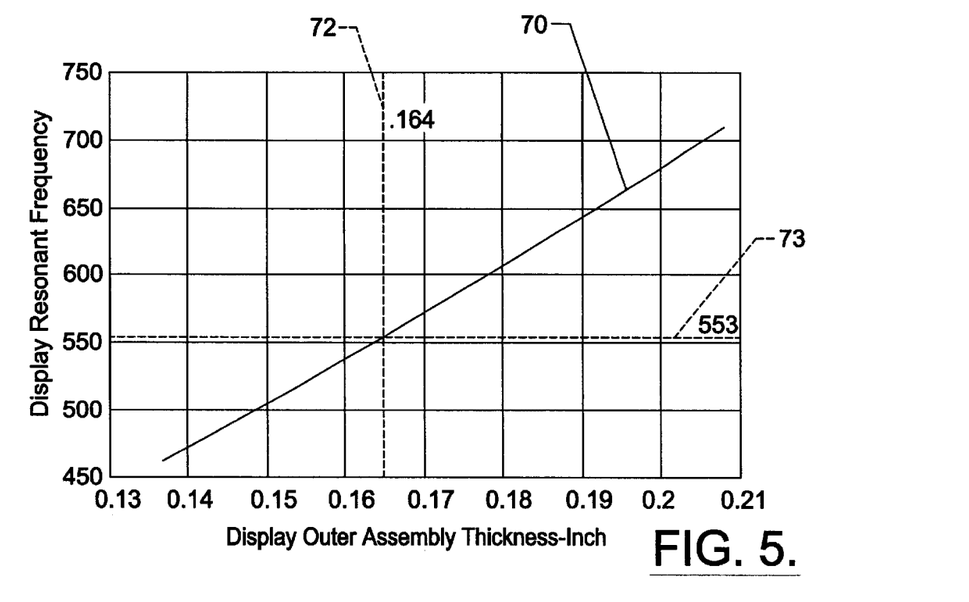
FIG. 5 is a graph illustrating glass thickness versus frequency for a front panel assembly as described in the example.

Based upon the following parameters, a relationship between the front assembly thickness and its resonant frequency can be determined as follows:

| | |
|---|---|
| $\mu = 0.25$ | Poisson's Ratio |
| $E_1 = 9.2 \cdot 10^6$ psi | Modulus of Elast. Layer #1 (borosilicate glass) |
| $E_2 = 0.5 \cdot 10^6$ psi | Modulus of Elast. Layer #2 (epoxy) |
| $E_3 = 9.4 \cdot 10^6$ psi | Modulus of Elast. Layer #3 (TN abs. glass) |
| $E_4 = 0.5 \cdot 10^6$ psi | Modulus of Elast. Layer #4 (epoxy) |
| $E_5 = 9.2 \cdot 10^6$ psi | Modulus of Elast. Layer #5 (borosilicate glass) |
| $E_6 = 0.5 \cdot 10^6$ psi | Modulus of Elast. Layer #6 (polarizer) |
| $E_7 = 10.1 \cdot 10^6$ psi | Modulus of Elast. Layer #7 (LCD, Corning 1737F) |
| $b = 8.54$ in | Glass Unsupported Width |
| $a = 6.30$ in | Glass Unsupported Length |
| $W_c = 0.00$ lb | Est. Non-Structural Weight Supported by Glass |
| $t_1 = 0.040$ in | Thickness of Layer #1 |
| $t_2 = 0.001$ in | Thickness of Layer #2 |
| $t_3 = 0.040$ in | Thickness of Layer #3 |
| $t_4 = 0.001$ in | Thickness of Layer #4 |
| $t_5 = 0.0$ in | Initial Thickness of Layer #5 |
| $t_{5i} = t_{5+i \cdot z}$ | Variable Thickness of Layer #5 |
| $t_6 = 0.009$ in | Thickness of Layer #6 |
| $t_7 = 0.045$ in | Thickness of Layer #7 |
| $\rho_1 = 0.0775$ lb/in³ | Density of Layer #1 |
| $\rho_2 = 0.055$ lb/in³ | Density of Layer #2 |
| $\rho_3 = 0.1264$ lb/in³ | Density of Layer #3 |
| $\rho_4 = 0.055$ lb/in³ | Density of Layer #4 |
| $\rho_5 = 0.0775$ lb/in³ | Density of Layer #5 |
| $\rho_6 = 0.055$ lb/in³ | Density of Layer #6 |
| $\rho_7 = 0.0775$ lb/in³ | Density of Layer #7 |
| $W_1 = a \cdot b \cdot t_1 \cdot \rho_1$ | Weight of Layer #1 |
| $W_2 = a \cdot b \cdot t_2 \cdot \rho_2$ | Weight of Layer #2 |
| $W_3 = a \cdot b \cdot t_3 \cdot \rho_3$ | Weight of Layer #3 |
| $W_4 = a \cdot b \cdot t_4 \cdot \rho_4$ | Weight of Layer #4 |
| $W_4 = a \cdot b \cdot t_5 \cdot \rho_{5i}$ | Weight of Layer #5 |
| $W_6 = a \cdot b \cdot t_6 \cdot \rho_6$ | Weight of Layer #6 |
| $W_7 = a \cdot b \cdot t_7 \cdot \rho_7$ | Weight of Layer #7 |
| $h_{ri} t_1 + t_2 + t_3 + t_4 + t_{5i} + t_6 + t_7$ | Assembly Variable Thickness |
| $W_{ti} = W_1 + W_2 + W_3 + W_4 + W_{5i} + W_6 + W_7$ | Display Glass Total Weight |
| $A_1 = b \cdot t_1$ | Layer #1 Cross Sectional Area |
| $A_2 = b \cdot t_2$ | Layer #2 Cross Sectional Area |
| $A_3 = b \cdot t_3$ | Layer #3 Cross Sectional Area |
| $A_4 = b \cdot t_4$ | Layer #4 Cross Sectional Area |
| $A_5 = b \cdot t_{5i}$ | Layer #5 Cross Sectional Area |
| $A_6 = b \cdot t_6$ | Layer #6 Cross Sectional Area |
| $A_7 = b \cdot t_7$ | Layer #7 Cross Sectional Area |

The distance from Layer #1 surface to neutral axis can be found from:

$$Z_i = \frac{\begin{bmatrix} A_1 \cdot E_1 \cdot \frac{t_1}{2} + A_2 \cdot E_2 \cdot \left(t_1 + \frac{t_2}{2}\right) + A_3 \cdot E_3 \cdot \left(t_1 + t_2 + \frac{t_3}{2}\right) + \\ A_4 \cdot E_4 \cdot \left(t_1 + t_2 + t_3 + \frac{t_4}{2}\right) \ldots + \\ A_{5_i} \cdot E_5 \cdot \left(t_1 + t_2 + t_3 + t_4 + \frac{t_{5_i}}{2}\right) + A_6 \cdot E_6 \cdot \\ \left(t_1 + t_2 + t_3 + t_4 + t_{5_i} + \frac{t_6}{2}\right) \ldots + \\ A_7 \cdot E_7 \cdot \left(t_1 + t_2 + t_3 + t_4 + t_{5_i} + t_6 + \frac{t_7}{2}\right) \end{bmatrix}}{\begin{matrix} A_1 \cdot E_1 + A_2 \cdot E_2 + A_3 \cdot E_3 + \\ A_4 \cdot E_4 + A_{5_i} \cdot E_5 + A_6 \cdot E_6 + A_7 \cdot E_7 \end{matrix}}$$

| | |
|---|---|
| $c_{1i} = Z_i - t_1/2$ | Distance from Layer #1 centroid to Neutral Axis |
| $c_{2i} = Z_i - (t_1 + t_2/2)$ | Distance from Layer #2 centroid to Neutral Axis |
| $c_{3i} = Z_i - (t_1 + t_2 + t_3/2)$ | Distance from Layer #3 centroid to Neutral Axis |
| $c_{4i} = Z_i - (t_1 + t_2 + t_3 + t_4)$ | Dist. Layer #4 centroid to Neut. Axis |
| $c_{5i} = Z_i - (t_1 + t_2 + t_3 + t_4 + t_{5i}/2)$ | Dist. Layer #5 centroid to Neut. Axis |
| $c_{6i} = Z_i - (t_1 + t_2 + t_3 + t_4 + t_{5i} + t_6/2)$ | Dist. Layer #6 centroid to Neut. Axis |
| $c_{7i} = Z_i - (t_1 + t_2 + t_3 + t_4 + t_{5i} + t_6 + t_7/2)$ | Dist. Layer #7 centroid to Neut. Axis |
| $S_e = 100\%$ | Shear Efficiency |
| $S_{pol} = 65\%$ | Shear Efficiency |
| $I_1 = b \cdot t_1^3/12$ | Area Moment of Inertia of Layers #1–#7 |
| $I_2 = b \cdot t_2^3/12$ | |
| $I_3 = b \cdot t_3^3/12$ | |
| $I_4 = b \cdot t_4^3/12$ | |
| $I_5 = b \cdot t_5^3/12$ | |
| $I_6 = b \cdot t_6^3/12$ | |
| $I_7 = b \cdot t_7^3/12$ | |
| $I_{T1i} = I_1 + S_e \cdot A_1 \cdot (c_{1i})^2$ | Area Moment of Inertia of Layers #1 to #7 About the Composite Neutral Axis |
| $I_{T2i} = I_2 + S_e \cdot A_2 \cdot (c_{2i})^2$ | |
| $I_{T3i} = I_3 + S_e \cdot A_3 \cdot (c_{3i})^2$ | |
| $I_{T4i} = I_4 + S_e \cdot A_4 \cdot (c_{4i})^2$ | |
| $I_{T5i} = I_{5i} + S_e \cdot A_{5i} \cdot (c_{5i})^2$ | |
| $I_{T6i} = I_6 + S_e \cdot A_6 \cdot (c_{6i})^2$ | |
| $I_{T7i} = I_7 + S_e \cdot A_7 \cdot (c_{7i})^2$ | |

Accordingly, the equivalent area moment of inertia is given by:

$$I_{eq_i} = \frac{b \cdot (t_1 + t_2 + t_3 + t_4 + t_{5_i} + t_6 + t_7)^3}{12}$$

and the equivalent modulus of elasticity is given by:

$$e_{eq_i} = \frac{E_1 \cdot I_{T1_i} + E_2 \cdot I_{T2_i} + E_3 \cdot I_{T3_i} + E_4 \cdot I_{T4_i} + E_5 \cdot I_{T5_i} + E_6 \cdot I_{T6_i} + E_7 \cdot I_{T7}}{I_{eq_i}}$$

Moreover, the edge simple support is as follows:

$$fl_{2_i} = \left(\frac{1}{a^2} + \frac{1}{b^2}\right) \cdot \sqrt{\frac{\frac{E_{eq_i} \cdot (h_{r_i})^3}{12 \cdot (1 - \mu^2)}}{\frac{Wt_i}{a \cdot b}}} \cdot \left(\frac{\pi}{2}\right)$$

The plot labeled 70 of FIG. 5 illustrates the relationship of display thickness versus resonant frequency. Of interest, for a thickness of 0.164 in shown by dotted vertical line 72, the corresponding frequency is indicated by the intersection with the dotted horizontal line 73 at 553 Hz. The resonant frequencies for other thickness may be readily determined from the graph as would be appreciated by those skilled in the art.

Figure 6:
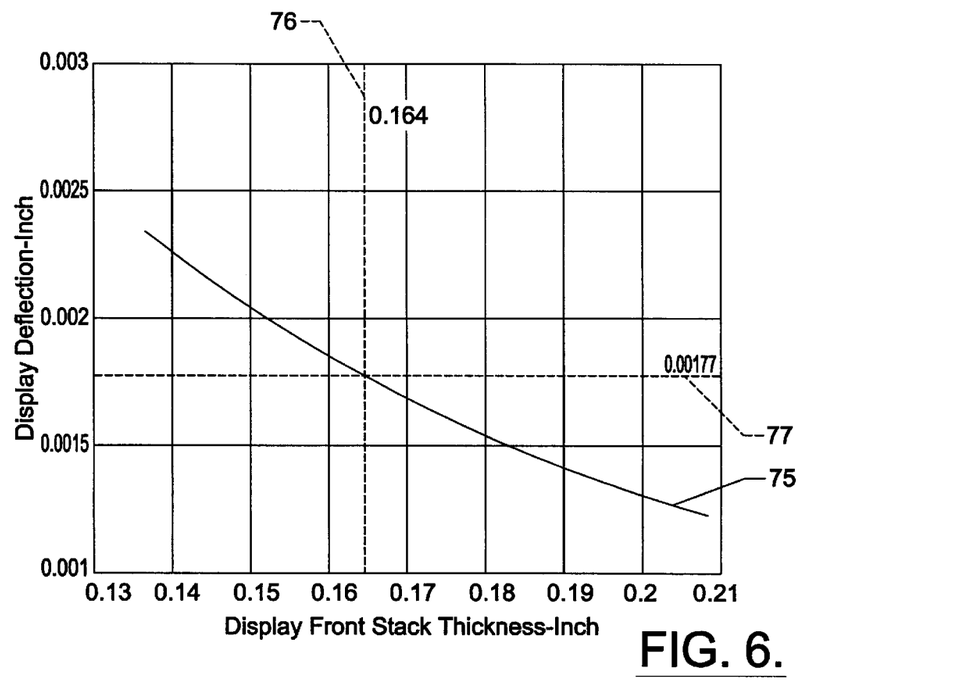
FIG. 6 is a graph illustrating glass deflection versus glass stack thickness for the front panel assembly as described in the example.

Continuing the analysis, the amount of glass deflection may also be readily determined as follows.

| | |
|---|---|
| $\zeta = 4.4\%$ | Estimated Structural Damping |
| $Q \frac{1}{2} \cdot \zeta$ | Estimated Amplification Based Upon Damping |
| $PSD = 0.31/Hz$ | Estimated Power Spectral Density |

$G_{sdof_i} = (\pi/2 \cdot PSD \cdot Q \cdot fl_{2_i})^{.5}$ Equiv. Single Deg. Freedom "G" Level Accordingly, the glass stack deflection versus resonant frequency is found by:

$$\delta_i = \frac{G_{sdof_i} \cdot g}{4 \cdot \pi^2 \cdot (fl_{2_i})^2}$$

A graphical plot labeled 75 for the display deflection versus front assembly thickness is shown in FIG. 6. The vertical dotted line 76 represents a thickness of 0.164 inches, and as can be seen, intersects the plot at the horizontal dashed line 77 indicated that the deflection would be 0.00177 in. This amount of deflection was determined to be acceptable in view of a threshold of lower than about 0.002 inches.

Figure 7:
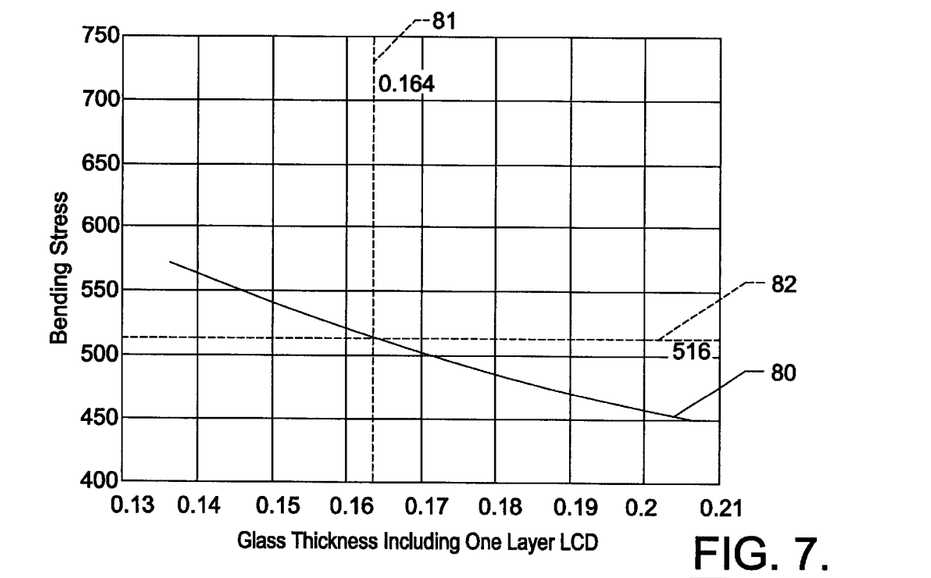
FIG. 7 is a graph illustrating bending stress as a function of glass thickness for the front panel assembly as described in the example.

The plate deflection and stress with a uniform load is determined as follows:
$r_r = b/a$ aspect ratio
$j = 1 \ldots 10$
$r_j = 0.1 \cdot (j-1)$

| $r_j =$ | $\beta_j =$ | |
|---|---|---|
| 1 | 0.2874 | vs = csplin (r, β) |
| 1.2 | 0.3762 | |
| 1.4 | 0.4530 | interp (vs, r, β, $r_r$) = 0.5 |
| 1.6 | 0.5172 | |
| 1.8 | 0.5688 | |
| 2 | 0.6102 | |
| 3 | 0.7134 | |
| 4 | 0.7410 | |
| 5 | 0.7476 | |
| 100 | 0.750 | |

$$\sigma_i = \frac{interp(vs, r, \beta, r_r) \cdot \frac{Wt_i \cdot G_{sdof_i} \cdot g}{a \cdot b} \cdot a^2}{(h_{r_i})^2}$$

The bending stress as a function of the glass thickness based upon the above is shown by the plot 80 of FIG. 7. In particular, the vertical line 81 is for the thickness of 0.164 as used in this example. The vertical line 81 intersects the horizontal line 82 indicated that a stress of 516 would be experienced. This level is well below stresses which may damage the glass as would be readily appreciated by those skilled in the art.

Having now determined the various workable parameters for the front panel assembly 46, the analysis may now turn to ensuring matching of the rear panel assembly 47 as given below.

Figure 8:
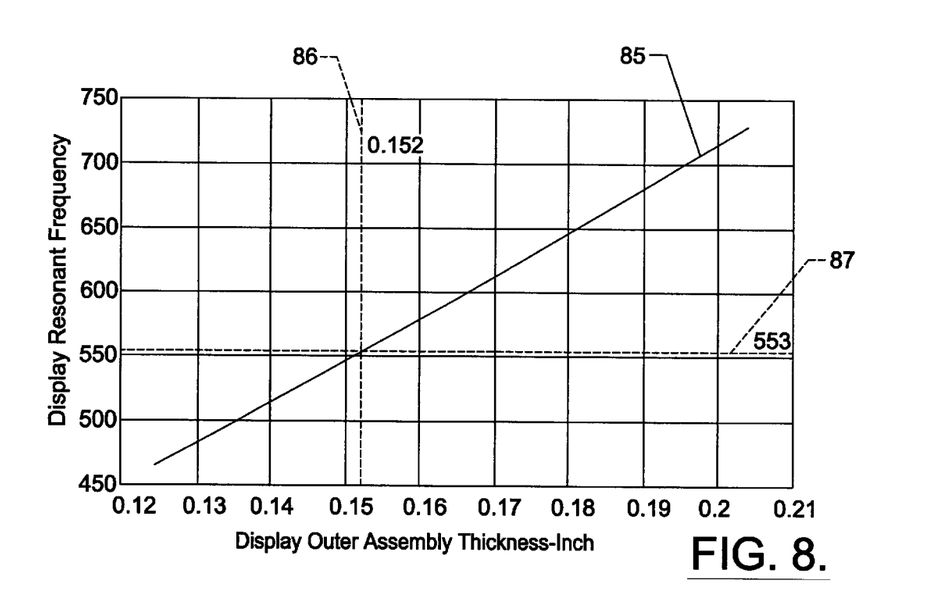
FIG. 8 is a graph illustrating glass thickness versus frequency for a rear panel assembly described in the example.

| | |
|---|---|
| $\mu = 0.25$ | Poisson's Ratio |
| $E_1 = 9.2 \cdot 10^6$ psi | Modulus of Elast. Layer #1 (borosilicate glass) |
| $E_2 = 0.5 \cdot 10^6$ psi | Modulus of Elast. Layer #2 (epoxy) |
| $E_3 = 9.2 \cdot 10^6$ psi | Modulus of Elast. Layer #3 (borosilicate glass) |
| $E_4 = 0.1 \cdot 10^6$ psi | Modulus of Elast. Layer #4 (polarizer) |
| $E_5 = 10.1 \cdot 10^6$ psi | Modulus of Elast. Layer #5 (LCD, Corning 1737F) |
| $t_1 = 0.070 \cdot$ in | Initial Thickness of Layer #1 |
| $t_{1i} = t_{1+i \cdot z}$ | Variable Thickness of Layer #1 |
| $t_2 = 0.001$ in | Thickness of Layer #2 |
| $t_3 = 0.00$ in | Thickness of Layer #3 |
| $t_4 = 0.008$ in | Thickness of Layer #4 |
| $t_5 = 0.045$ in | Thickness of Layer #5 |
| $\rho_1 = 0.0775$ lb/in$^3$ | Density of Layer #1 |
| $\rho_2 = 0.055$ lb/in$^3$ | Density of Layer #2 |
| $\rho_3 = 0.0775$ lb/in$^3$ | Density of Layer #3 |
| $\rho_4 = 0.055$ lb/in$^3$ | Density of Layer #4 |
| $\rho_5 = 0.0775$ lb/in$^3$ | Density of Layer #5 |
| $W_{1i} = a \cdot b \cdot t_{1i} \rho_1$ | Weight of Layer #1 |
| $W_2 = a \cdot b \cdot t_2 \cdot \rho_2$ | Weight of Layer #2 |
| $W_3 = a \cdot b \cdot t_3 \cdot \rho_3$ | Weight of Layer #3 |
| $W_4 = a \cdot b \cdot t_4 \cdot \rho_4$ | Weight of Layer #4 |
| $W_5 = a \cdot b \cdot t_5 \cdot \rho_5$ | Weight of Layer #5 |
| $h_{r_i} = t_{1_i} + t_2 + t_3 + t_4 + t_5$ | Assembly Variable Thickness |
| $Wt_i = W_{1_i} + W_2 + W_3 + W_4 + W_5$ | Display Glass Total Weight |
| $A_{1i} = b \cdot t_{1i}$ | Layer #1 Cross Sectional Area |
| $A_2 = b \cdot t_2$ | Layer #2 Cross Sectional Area |
| $A_3 = b \cdot t_3$ | Layer #3 Cross Sectional Area |
| $A_4 = b \cdot t_4$ | Layer #4 Cross Sectional Area |
| $A_5 = b \cdot t_5$ | Layer #5 Cross Sectional Area |

Accordingly, the distance from Layer #1 Surface to Neutral Axis is given by:

$$Z_i = \frac{\begin{bmatrix} A_1 \cdot E_1 \cdot \frac{t_1}{2} + A_2 \cdot E_2 \cdot \left(t_1 + \frac{t_2}{2}\right) + A_3 \cdot E_3 \cdot \left(t_1 + t_2 + \frac{t_3}{2}\right) + \\ A_4 \cdot E_4 \cdot \left(t_1 + t_2 + t_3 + \frac{t_4}{2}\right) \ldots + \\ A_5 \cdot E_5 \cdot \left(t_1 + t_2 + t_3 + t_4 + \frac{t_5}{2}\right) \end{bmatrix}}{A_1 \cdot E_1 + A_2 \cdot E_2 + A_3 \cdot E_3 + A_4 \cdot E_4 + A_5 \cdot E_5}$$

| | |
|---|---|
| $c_{1_i} = Z_i - t_{1_i}/2$ | Distance from Layer #1 centroid to Neutral Axis |
| $c_{2_i} = Z_i - (t_{1_i} + t_2/2)$ | Distance from Layer #2 centroid to Neutral Axis |
| $c_{3_i} = Z_i - (t_{1_i} + t_2 + t_3/2)$ | Layer #3 centroid to Neutral Axis |
| $c_{4_i} = Z_i - (t_{1_i} + t_2 + t_3 + t_4)$ | Layer #4 centroid to Neut. Axis |
| $c_{5_i} = Z_i - (t_{1_i} + t_2 + t_3 + t_4 + t_5/2)$ | Layer #5 centroid to Neut. Axis |
| $S_e = 100\%$ | Shear Efficiency |
| $S_{pol} = 65\%$ | Shear Efficiency |
| $I_{1_i} = b \cdot t_{1_i}^3/12$ | Area Moment of Inertia of Layers #1–#7 |
| $I_2 = b \cdot t_2^3/12$ | |
| $I_3 = b \cdot t_3^3/12$ | |
| $I_4 = b \cdot t_4^3/12$ | |
| $I_5 = b \cdot (t_5)^3/12$ | |
| $I_{T1_i} = I_{1_i} + S_e \cdot A_{1_i} \cdot (c_{1_i})^2$ | Area Moment of Inertia of Layers #1 to #5 About the Composite Neutral Axis |
| $I_{T2_i} = I_2 + S_e \cdot A_2 \cdot (c_{2_i})^2$ | |
| $I_{T3_i} = I_3 + S_e \cdot A_3 \cdot (c_{3_i})^2$ | |
| $I_{T4_i} = I_4 + S_{pol} \cdot A_4 \cdot (c_{4_i})^2$ | |
| $I_{T5_i} = I_5 + S_{pol} \cdot A_5 \cdot (c_{5_i})^2$ | |

Accordingly, the equivalent area moment of inertia is given by:

$$I_{eq_i} = b \cdot (t_{1_i} + t_2 + t_3 + t_4 + t_5)^3/12$$

And the equivalent modulus of elasticity is given by:

$$E_{eq_i} = (E_1 \cdot I_{T1_i} + E_2 \cdot I_{T2_i} + E_3 \cdot I_{T3_i} + E_4 \cdot I_{T4_i} + E_5 \cdot I_{T5_i})/I_{eq_i}$$

Moreover, the edge simple support is as follows:

$$fl_{2_i} = \left(\frac{1}{a^2} + \frac{1}{b^2}\right) \cdot \left[\sqrt{\frac{\frac{E_{eq_i} \cdot (h_{r_i})^3}{12 \cdot (1 - \mu^2)}}{\frac{Wt_i}{a \cdot b}}}\right] \cdot \left(\frac{\pi}{2}\right)$$

The plot labeled 85 of FIG. 8 illustrates this relationship of display thickness versus resonant frequency for the rear panel assembly 47. Of interest, for a thickness of 0.0152 in shown by the dotted vertical line 86, the corresponding frequency is indicated by the intersection with the dotted horizontal line 87 at 553 Hz, and this is the frequency calculated for the front panel assembly 46 above. In other words, in this example, the rear panel assembly should have a thickness of 0.164 in to match the resonant frequency, 533 Hz of the front patent assembly.

Figure 9:
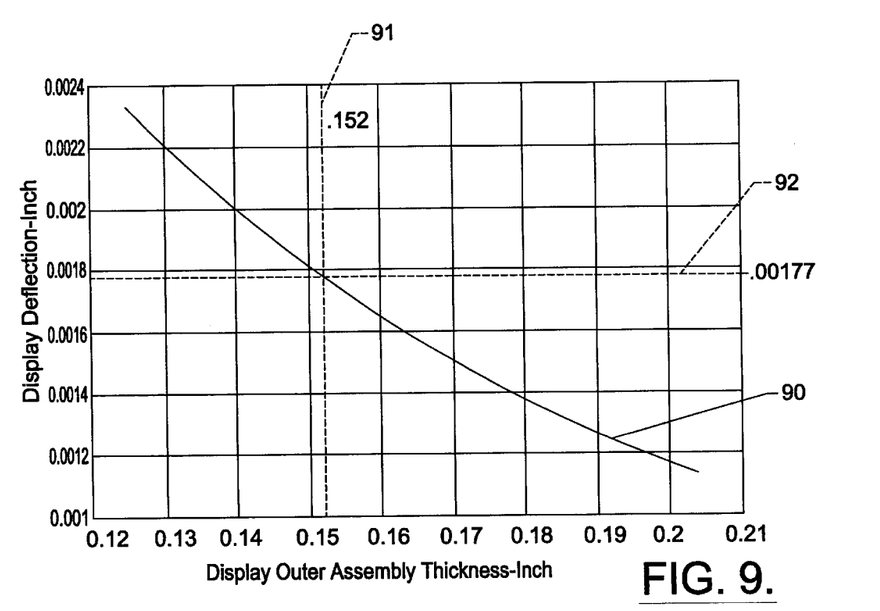
FIG. 9 is a graph illustrating glass deflection versus glass stack thickness for the rear panel assembly described in the example.

Continuing the analysis, the amount of glass deflection may also be readily determined as follows.

| | |
|---|---|
| $\zeta = 4.4\%$ | Estimated Structural Damping |
| $Q = \frac{1}{2} \cdot \zeta$ | Estimated Amplification Based Upon Damping |
| PSD = 0.31/Hz | Estimated Power Spectral Density |

$G_{sdof_i} = (\pi/2 \cdot \text{PSD} \cdot Q \cdot fl_{2_i})^{.5}$ Equiv. Single Deg. of Free. "G"

The glass stack deflection as a function of the resonant frequency is given by:

$$\delta_i = \frac{G_{sdof_i} \cdot g}{4 \cdot \pi^2 \cdot (fl_{2_i})^2}$$

A graphical plot labeled 90 for the display deflection versus front assembly thickness is shown in FIG. 9. The vertical dotted line 91 represents a thickness of 0.152 inches, and as can be seen, intersects the plot at the horizontal dashed line 92 indicated that the deflection would be 0.00177 in. This amount of deflection was determined to be acceptable in view of a threshold of lower than about 0.002 inches.

Figure 10:
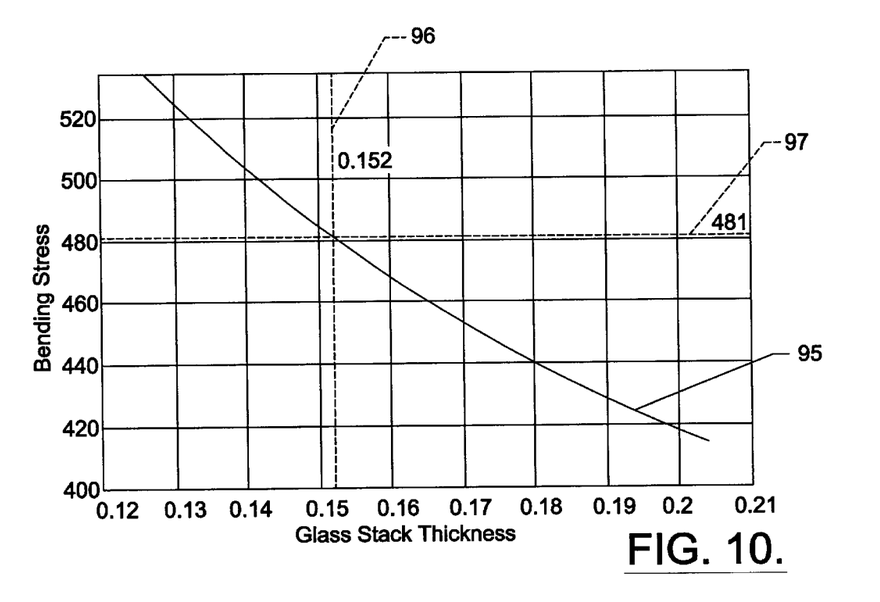
FIG. 10 is a graph illustrating bending stress as a function of glass thickness for the rear panel assembly described in the example.

The stress based upon the thickness under a uniform load may also be calculated as follows.

$r_r = b/a$ Plate aspect ratio
$j = 1 \ldots 10$
$r_j = 0.1 \cdot (j-1)$

| $r_j$ = | $\beta_j$ = | |
|---|---|---|
| 1 | 0.2874 | vs = csplin (r, β) |
| 1.2 | 0.3762 | |
| 1.4 | 0.4530 | interp (vs, r, β, $r_r$) = 0.5 |
| 1.6 | 0.5172 | |
| 1.8 | 0.5688 | |
| 2 | 0.6102 | |
| 3 | 0.7134 | |
| 4 | 0.7410 | |
| 5 | 0.7476 | |
| 100 | 0.750 | |

$$a_i = \frac{interp(vs, r, \beta, r_r) \cdot \frac{WT_i \cdot G_{sdof_i} \cdot g}{a \cdot b} \cdot a^2}{(h_{r_i})^2}$$

The bending stress as a function of the glass thickness is shown by the plot 95 of FIG. 10. In particular, the vertical line 96 is for the thickness of 0.152 as used in rear panel assembly 47 in this example. The vertical line 96 intersects the horizontal line 97 indicated that a stress of 481 would be experienced. This level is well below stresses which may damage the glass as would be readily appreciated by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A liquid crystal display (LCD) comprising:
    a first panel assembly and a second panel assembly;
    a liquid crystal material layer positioned between said first and second panel assemblies; and
    a frame mounted around a periphery of said first and second panel assemblies;
    said first panel assembly having a coefficient of thermal expansion substantially the same as a coefficient of thermal expansion of said second panel assembly, and said frame having a coefficient of thermal expansion substantially the same as the coefficient of thermal expansion of said first and second panel assemblies.

2. An LCD according to claim 1 wherein said first panel assembly comprises a support panel.

3. An LCD according to claim 2 wherein said support panel comprises a glass plate.

4. An LCD according to claim 1 wherein said second panel assembly comprises at least one filter panel.

5. An LCD according to claim 1 wherein said second panel assembly comprises a support panel.

6. An LCD according to claim 5 wherein said support panel comprises a glass plate.

7. An LCD according to claim 1 wherein each of said first and second panel assemblies comprises glass having a coefficient of thermal expansion in a range of about 2.6 to 6.2 in/(in)(° F.)×10$^{-6}$.

8. An LCD according to claim 7 wherein said frame comprises a material having a coefficient of thermal expansion of about 5.2 in/(in)(° F.)×10$^{-6}$.

9. An LCD according to claim 8 wherein said frame comprises titanium.

10. An LCD according to claim 1 wherein said first panel assembly has the coefficient of thermal expansion substantially the same as a coefficient of thermal expansion of said second panel assembly, and said frame has the coefficient of thermal expansion substantially the same as the coefficient of thermal expansion of said first and second panel assemblies over a temperature range of about −65° to 185° F.

11. A liquid crystal display (LCD) comprising:
    a first panel assembly and a second panel assembly, each of said first and second panel assemblies comprising a material having a coefficient of thermal expansion in a range of about 2.6 to 6.2 in/(in)(° F.)×10$^{-6}$;
    a liquid crystal material layer positioned between said first and second panel assemblies; and
    a frame mounted around a periphery of said first and second panel assemblies, said frame comprising a different material than the material of said first and second panel assembly but also having a coefficient of thermal expansion in a range of about 2.6 to 6.2 in/(in)(° F.)×10$^{-6}$.

12. An LCD according to claim 11, wherein said first panel assembly comprises a support panel.

13. An LCD according to claim 12 wherein said support panel comprises a glass plate.

14. An LCD according to claim 12 wherein said second panel assembly comprises at least one filter panel.

15. An LCD according to claim 11 wherein said second panel assembly comprises a support panel.

16. An LCD according to claim 15 wherein said support panel comprises a glass plate.

17. An LCD according to claim 11 wherein the material of said frame has a coefficient of thermal expansion of about 5.2 in/(in)(° F.)×10$^{-6}$.

18. An LCD according to claim 17 wherein said frame comprises titanium.

19. A liquid crystal display (LCD) comprising:
    a first panel assembly comprising a glass support panel;
    a second panel assembly comprising a glass support panel;
    a liquid crystal material layer positioned between said first and second panel assemblies; and
    a frame mounted around a periphery of said first and second panel assemblies, said frame comprising titanium so that said frame has a coefficient of thermal expansion substantially the same as a coefficient of thermal expansion of said first and second panel assemblies.

20. An LCD according to claim 19 wherein said second panel assembly further comprises at least one filter panel.

* * * * *

UNITED STATES PATENT AND TRADEMARK OFFICE
CERTIFICATE OF CORRECTION

PATENT NO. : 6,606,132 B2
DATED : August 12, 2003
INVENTOR(S) : Giannatto

It is certified that error appears in the above-identified patent and that said Letters Patent is hereby corrected as shown below:

Column 1,
Line 48, insert -- a -- between "as" and "single"

Column 3,
Line 56, insert -- be -- between "may" and "used"

Column 5,
Line 64, insert -- = -- between "$h_{ri}$" and "$t_1$"

Column 6,
Line 38, delete "$I_{T1i} = I_1 + S_e \cdot A_1 \cdot (c_{i1})^{2"}$" insert -- $I_{T1i} = I_1 + S_e \cdot A_1 \cdot (c_{1i})^2$ --

Column 8,
Line 1, delete "in" insert -- is --
Line 13, insert -- = -- between "Q" and "½"

Column 9,
Lines 33-38, Delete:

$$Z_i = \frac{\left[ A_1 \cdot E_1 \cdot \frac{t_1}{2} + A_2 \cdot E_2 \cdot \left(t_1 + \frac{t_2}{2}\right) + A_3 \cdot E_3 \cdot \left(t_1 + t_2 + \frac{t_3}{2} +\right) \atop A_4 \cdot E_4 \cdot \left(t_1 + t_2 + t_3 + \frac{t_4}{2}\right) \ldots + \atop A_5 \cdot E_5 \cdot \left(t_1 + t_2 + t_3 + t_4 + \frac{t_5}{2}\right) \right]}{A_1 \cdot E_1 + A_2 \cdot E_2 + A_3 \cdot E_3 + A_4 \cdot E_4 + A_5 \cdot E5}$$

Insert --

$$Z_i = \frac{\left[ A_{1i} \cdot E_1 \cdot \frac{t_{1i}}{2} + A_2 \cdot E_2 \cdot \left(t_{1i} + \frac{t_2}{2}\right) + A_3 \cdot E_3 \cdot \left(t_{1i} + t_2 + \frac{t_3}{2} +\right) \atop A_4 \cdot E_4 \cdot \left(t_{1i} + t_2 + t_3 + \frac{t_4}{2}\right) \ldots + \atop A_5 \cdot E_5 \cdot \left(t_{1i} + t_2 + t_3 + t_4 + \frac{t_5}{2}\right) \right]}{A_1 \cdot E_1 + A_2 \cdot E_2 + A_3 \cdot E_3 + A_4 \cdot E_4 + A_5 \cdot E_5}$$

--

UNITED STATES PATENT AND TRADEMARK OFFICE
CERTIFICATE OF CORRECTION

PATENT NO.   : 6,606,132 B2
DATED        : August 12, 2003
INVENTOR(S)  : Giannatto It is certified that error appears in the above-identified patent and that said Letters Patent is hereby corrected as shown below:

<u>Column 10,</u>
Line 42, delete "in" insert -- is --

<u>Column 12,</u>
Line 39, delete "claim 12" insert -- claim 11 --

Signed and Sealed this

Fourth Day of November, 2003

JAMES E. ROGAN
*Director of the United States Patent and Trademark Office*